(12) United States Patent
Hall et al.

(10) Patent No.: US 11,428,132 B2
(45) Date of Patent: Aug. 30, 2022

(54) METHOD FOR OPERATING A DRIVE DEVICE AND CORRESPONDING DRIVE DEVICE

(71) Applicant: AUDI AG, Ingolstadt (DE)

(72) Inventors: Matthew David Hall, Marbach am Neckar (DE); Guido Schiedt, Leutenbach (DE)

(73) Assignee: AUDI AG, Ingolstadt (DE)

( * ) Notice: Subject to any disclaimer, the term of this patent is extended or adjusted under 35 U.S.C. 154(b) by 13 days.

(21) Appl. No.: 17/283,696

(22) PCT Filed: Nov. 22, 2019

(86) PCT No.: PCT/EP2019/082301
§ 371 (c)(1),
(2) Date: Apr. 8, 2021

(87) PCT Pub. No.: WO2020/126314
PCT Pub. Date: Jun. 25, 2020

(65) Prior Publication Data
US 2021/0340895 A1 Nov. 4, 2021

(30) Foreign Application Priority Data
Dec. 20, 2018 (DE) ...................... 10 2018 222 512.5

(51) Int. Cl.
*F01N 3/20* (2006.01)
(52) U.S. Cl.
CPC ......... *F01N 3/2013* (2013.01); *F01N 3/2053* (2013.01); *F01N 2240/16* (2013.01); *F01N 2410/06* (2013.01)

(58) Field of Classification Search
CPC ............. F01N 2240/16; F01N 2290/06; F01N 2410/00; F01N 2410/06; F01N 2900/08;
(Continued)

(56) References Cited

U.S. PATENT DOCUMENTS 5,458,673 A * 10/1995 Kojima ................. F01N 13/011
95/11
7,735,314 B2 * 6/2010 Lu ........................... F01N 3/106
60/287
(Continued)

FOREIGN PATENT DOCUMENTS

DE        4435213 A1    4/1996
DE    102018106588 A1    9/2019
(Continued)

OTHER PUBLICATIONS

German Examination Report dated Nov. 4, 2019 in corresponding German Application No. 10 2018 222 512.5; 16 pages; Machine translation attached.
(Continued)

*Primary Examiner* — Anthony Ayala Delgado
(74) *Attorney, Agent, or Firm* — Maier & Maier, PLLC

(57) ABSTRACT

A method for operating a drive device which includes a drive unit and an exhaust gas purification device arranged in an exhaust gas line for purifying exhaust gas from the drive unit. The exhaust gas purification device is heated at least temporarily by an electrical heating assembly, which includes a heating element for heating a fluid and a bypass line branching off the exhaust gas purification device from the exhaust gas line on the one hand and opening into it on the other hand, in which a fluid pump for conveying the fluid through the exhaust gas purification device is arranged.

20 Claims, 1 Drawing Sheet

(58) Field of Classification Search
CPC ........ F01N 3/027; F01N 3/031; F01N 3/2013; F01N 3/2053; F01N 9/00
See application file for complete search history.

(56) References Cited

U.S. PATENT DOCUMENTS

| | | | |
|---|---|---|---|
| 8,261,534 B2* | 9/2012 | Sano | F01N 3/0878 60/285 |
| 2006/0117741 A1* | 6/2006 | Mayer | F01N 3/2066 60/286 |
| 2010/0205939 A1* | 8/2010 | Sano | F01N 3/0842 60/276 |
| 2012/0198821 A1* | 8/2012 | Soukhojak | F01N 3/2882 60/274 |
| 2018/0023450 A1* | 1/2018 | Zhang | F01N 9/00 60/602 |
| 2019/0383190 A1* | 12/2019 | Stock | F01N 3/2066 |

FOREIGN PATENT DOCUMENTS

| | | |
|---|---|---|
| GB | 2254014 A | 9/1992 |
| JP | S59-173515 A | 10/1984 |
| JP | 2013-124609 A | 6/2013 |
| NO | 96/10686 A1 | 4/1996 |

OTHER PUBLICATIONS

International Search Report (with English translation) and Written Opinion (with Machine translation) dated Feb. 6, 2020 in corresponding International Application No. PCT/EP2019/082301; 18 pages.

International Preliminary Report on Patentability dated Jun. 16, 2021 in corresponding International Application No. PCT/EP2019/082301; 23 pages.

* cited by examiner

METHOD FOR OPERATING A DRIVE DEVICE AND CORRESPONDING DRIVE DEVICE

FIELD

The invention relates to a method for operating a drive device which includes a drive unit and an exhaust gas purification device arranged in an exhaust gas line for purifying exhaust gas of the drive unit, wherein the exhaust gas purification device is at least temporarily heated by means of an electrical heating assembly, which includes a heating element for heating a fluid and a bypass line, which branches off on one side of the exhaust gas device from the exhaust gas line and on the other side opens into it, and in which a fluid pump is arranged for conveying the fluid through the exhaust gas purification device. The invention also relates to a drive device.

BACKGROUND

Document GB 2 254 014 A1 is known from the prior art, for example. This describes a catalytic converter that can be heated up quickly or an exhaust gas tract having a catalytic converter and a bypass line, which is fluidically connected in parallel to the catalytic converter to form a closed recirculation loop around the converter. A fan forces gases to recirculate through the loop and an electrically operated heater is arranged along the loop to heat the recirculating gas to reduce a heating time.

It is the object of the invention to propose a method for operating a drive device which has advantages over known methods, in particular enables the exhaust gas purification device to be heated up quickly while heating it evenly at the same time.

SUMMARY

This object is achieved according to the invention by a method for operating a drive device. It is provided that, to heat the exhaust gas purification device before the drive unit is started, the fluid pump is operated for fluid heated by means of the heating element to flow through the exhaust gas purification device against an exhaust gas flow direction through the exhaust gas line.

The method is used to operate the drive device, which is part of a motor vehicle, for example. In this case, the drive device is used to drive the motor vehicle and thus to supply a torque intended to drive the motor vehicle. To generate the drive torque, the drive device has the drive unit, which generates exhaust gas during its operation. The drive unit is provided, for example, in the form of an internal combustion engine or the like.

To discharge the exhaust gas generated by the drive unit, the drive device includes the exhaust gas line. The exhaust gas line is used to discharge the exhaust gas from the drive unit, in particular in the direction of an external environment. On the one hand, the exhaust gas line is thus fluidically connected to the drive unit. On the other hand, it opens into the outside environment. The exhaust gas purification device, which is used to purify the exhaust gas, is arranged in the exhaust gas line. The exhaust gas purification device is provided in the form of a vehicle catalytic converter and/or a particle filter, for example. The exhaust gas line is preferably supplied with all of the exhaust gas generated by the drive unit, so that this gas flows completely through the exhaust gas purification device during operation of the drive unit. The exhaust gas is only supplied to the outside environment downstream of the exhaust gas purification device.'

During operation of the drive unit, the exhaust gas flows through the exhaust gas line and the exhaust gas purification device in a specific exhaust gas flow direction which originates from the drive unit and points in the direction of the external environment. In order to achieve effective purification of the exhaust gas by means of the exhaust gas purification device, it is necessary for the exhaust gas purification device to have a specific temperature, which can also be referred to as the operating temperature of the exhaust gas purification device. Until this operating temperature is reached by a current temperature of the exhaust gas purification device, pollutants contained in the exhaust gas are only partially converted into less hazardous products. However, if the temperature corresponds to the operating temperature or is at least in an operating temperature range of the exhaust gas purification device, the pollutants are completely or at least largely converted into the harmless products, for example by oxidation and/or reduction.

In order to heat up the exhaust gas purification device as quickly as possible and bring it to its operating temperature, the electrical heating assembly is provided. This includes the heating element and the bypass line, in which the fluid pump is in turn arranged. With the aid of the fluid pump, the fluid is at least temporarily circulated through the bypass line and the exhaust gas line and heated here with the aid of the heating element. The fluid heated in this way flows through the exhaust gas purification device and thus heats it up. The fluid can be, for example, air, exhaust gas, or an exhaust gas-air mixture. The fluid is circulated with the aid of the fluid pump in such a way that a circular flow results through the bypass line and the exhaust gas line, which extends through the exhaust gas purification device.

After the drive unit is started, the exhaust gas generated by the drive unit flows through the exhaust gas purification device. The exhaust gas has a comparatively high temperature, so that the exhaust gas purification device is heated up quickly. In this case, the side of the exhaust gas purification device fluidically facing toward the drive unit is heated more quickly than the side facing away from the drive unit, so that ultimately the exhaust gas purification device is heated unevenly until the exhaust gas purification device is completely heated up and has its operating temperature. For this reason, it is now provided that the exhaust gas purification device is already heated before the drive unit is started, namely with the aid of the electrical heating assembly. In order to achieve even heating of the exhaust gas purification device also immediately after starting the drive unit, however, the fluid heated with the aid of the heating element is not to flow through the exhaust gas purification device in the exhaust gas flow direction, but rather against the exhaust gas flow direction.

This means that with the aid of the heating assembly, before the drive unit is started, the side of the exhaust gas purification device facing away from the drive unit is heated more quickly than the side facing toward the drive unit. If the drive unit is now started, i.e., the hot exhaust gas from the drive unit flows through the exhaust gas purification device, the thermal stresses occurring during the further heating of the exhaust gas purification device are significantly reduced because the exhaust gas purification device also already has a comparatively high temperature on its side facing away from the drive unit.

Starting the drive unit is to be understood to mean that the drive unit is switched from a switched-off state to a switched-on state. In the switched-off state, the drive unit does not generate any exhaust gas, whereas in the switched-on state it generates exhaust gas. In the case of an internal combustion engine, the switched-off drive unit is at a standstill, that is to say preferably has a speed of zero. During the starting of the internal combustion engine, the speed is increased until it has reached a speed other than zero, which in particular corresponds to at least a minimum speed or an idle speed.

The minimum speed here describes a speed of the internal combustion engine from which it can independently increase its speed further, that is, without external force influence. The idle speed, in contrast, is usually selected in such a way that the internal combustion engine is operated with as little consumption as possible and at the same time smoothly when it is not under load. The idle speed is usually higher than the minimum speed. After the drive unit is started, the drive unit is in its switched-on state. In this, it generates exhaust gas. In the case of the internal combustion engine, in the switched-on state there is a speed different from zero, which in particular corresponds to at least the minimum speed or at least the idle speed.

Using the procedure described, rapid heating of the exhaust gas purification device is achieved before the drive unit is started. The flow of the heated fluid through the exhaust gas purification device against the exhaust gas flow direction has the advantage that even heating of the exhaust gas purification device is achieved, so that thermal stresses within the exhaust gas purification device are prevented or at least partially avoided when the drive unit is subsequently started. The service life of the exhaust gas purification device is lengthened accordingly.

A further embodiment of the invention provides that the heating element is arranged in the bypass line and, to heat the exhaust gas purification device, the fluid is withdrawn from the exhaust gas line upstream of the exhaust gas purification device with respect to the exhaust gas flow direction, heated by means of the heating element, and fed back to the exhaust gas pipe downstream of the exhaust gas purification device, so that the fluid heated by means of the heating element flows through the exhaust gas purification device. The fluid withdrawn from the exhaust gas line into the bypass line thus has a lower temperature than the fluid subsequently fed back into the exhaust gas line from the bypass line. The fluid is therefore heated in the bypass line, in particular completely.

With the aid of the fluid pump, the above-mentioned circulation flow is generated in such a way that the fluid introduced into the exhaust gas line from the bypass line downstream of the exhaust gas purification device flows through the exhaust gas purification device against the exhaust gas flow direction and thereby heats it up. After flowing through the exhaust gas purification device, the fluid is withdrawn from the exhaust gas line back into the bypass line and heated again with the aid of the heating element. Such an arrangement of the heating element enables a complete decoupling of the heating element from the exhaust gas during the operation of the drive unit. The heating element is therefore not subjected to the exhaust gas, so that thermal damage to the heating element is reliably avoided.

A further preferred embodiment of the invention provides that the heating element is arranged in the exhaust gas line downstream of the exhaust gas purification device with respect to the exhaust gas flow direction and, to heat the exhaust gas purification device, the fluid is withdrawn from the exhaust gas line upstream of the exhaust gas purification device with respect to the exhaust gas flow direction and fed back to the exhaust gas line to flow through the exhaust gas purification device downstream of the exhaust gas purification device, so that the fluid is heated by means of the heating element and subsequently flows through the exhaust gas purification device. The arrangement of the heating element in the exhaust gas line downstream of the exhaust gas purification device can be provided additionally or alternatively to the arrangement of the heating element in the bypass line.

Due to the arrangement of the heating element in the exhaust gas line, the heating element does have exhaust gas flowing against it or flowing through it during the operation of the drive unit. Because of its arrangement downstream of the exhaust gas purification device, however, the thermal stress of the heating element is significantly reduced, so that a reduction in the service life of the heating element due to thermal stress is not to be expected. As already explained above, to heat the exhaust gas purification device, the fluid pump is operated in such a way that the fluid is withdrawn from the bypass line upstream of the exhaust gas purification device and reintroduced downstream, namely in particular at the same temperature. The exhaust gas introduced into the exhaust gas line then flows first through the heating element and then the exhaust gas purification device, so that it is heated with the aid of the heating element before flowing through the exhaust gas purification device and subsequently heats up the exhaust gas purification device.

A further preferred embodiment of the invention provides that the heating element is arranged in the exhaust gas line downstream of the exhaust gas purification device with respect to the exhaust gas flow direction and, to heat the exhaust gas purification device, the fluid is withdrawn from the exhaust gas line upstream of the exhaust gas purification device with respect to the exhaust gas flow direction and fed back to the exhaust gas line to flow through the exhaust gas purification device downstream of the exhaust gas purification device, so that the fluid heated by means of the heating element flows through the exhaust gas purification device. The arrangement of the heating element upstream of the exhaust gas purification device can be provided additionally or alternatively to the arrangement downstream and/or in the exhaust gas line.

It is true that the upstream arrangement of the heating element increases the thermal stress on the heating element due to the exhaust gas generated by the drive unit. Using this arrangement, however, particularly even heating of the exhaust gas purification device can be achieved because the exhaust gas purification device can, on the one hand, be heated by conductive heat transfer from the heating element and, on the other hand, fluid heated with the aid of the heating element flows into the exhaust gas purification device. With the aid of the heating element, the exhaust gas purification device can thus be heated from opposite sides, namely on one side conductively and on the other side convectively with the aid of the fluid. For the conductive heating, it is particularly preferably provided that the heating element presses directly against the exhaust gas purification device or is at least connected to it in a conductive heat-transferring manner.

In the scope of a further embodiment of the invention, it is provided that at least one further exhaust gas purification device is arranged in the exhaust gas line downstream of the exhaust gas purification device and the fluid for heating the exhaust gas purification device is introduced into the exhaust gas line downstream of the further exhaust gas purification device. In addition to the exhaust gas purification device, the further exhaust gas purification device is thus provided in the exhaust gas line. The exhaust gas purification device and the further exhaust gas purification device are fluidically arranged in succession in the exhaust gas line, so that the exhaust gas flows through first the exhaust gas purification device and then the further exhaust gas purification device during operation of the drive unit.

The electrical heating assembly is designed in such a way that both the exhaust gas purification device and the further exhaust gas purification device are heatable using it. For this purpose, the bypass line opens into the exhaust gas line on the side of the further exhaust gas purification device facing away from the exhaust gas purification device. Fluid introduced into the exhaust gas line by the bypass line thus first flows through the further exhaust gas purification device and only then flows through the exhaust gas purification device. Reliable heating of the exhaust gas purification device and the at least one further exhaust gas purification device is thereby implemented.

A preferred further embodiment of the invention provides that for further heating of the exhaust gas purification device after starting the drive unit, the fluid pump is operated for fluid heated by means of the heating element to flow through the exhaust gas purification device in the exhaust gas flow direction through the exhaust gas line. After starting the drive unit, i.e., as soon as exhaust gas flows through the exhaust gas line, the fluid pump is no longer operated for flow through the exhaust gas purification device against the exhaust gas flow direction, but rather for flow through in the exhaust gas flow direction.

This means that with the aid of the fluid pump, fluid, in particular exhaust gas in the form of the fluid, is withdrawn from the exhaust gas line downstream of the exhaust gas purification device and fed back into the exhaust gas line upstream of the exhaust gas purification device. Such a procedure is particularly useful if the heating element is arranged in the bypass line. In this case, the fluid withdrawn from the exhaust gas line can be heated again after flowing through the exhaust gas purification device and fed back to the exhaust gas purification device. Using such a procedure, particularly effective and rapid heating of the exhaust gas purification device is achieved.

A further preferred embodiment of the invention provides that a heating disk which is fluidically directly adjacent to the exhaust gas purification device is used as the heating element. The heating disk is to be understood as a heating element through which the fluid or exhaust gas to be heated flows. The heating disk is basically disk-shaped. It preferably extends at least predominantly through a flow cross section of the exhaust gas line, that is to say at least 50%, but preferably completely. For example, the heating disk has a heating grid which is electrically heatable. The heating disk directly adjoins the exhaust gas purification device fluidically, either upstream or downstream with respect to the exhaust gas flow direction. In this way, in addition to the convective heating of the exhaust gas purification device by means of the heated fluid, conductive heating is implemented at the same time. Accordingly, the heating of the exhaust gas purification device is particularly effective.

A refinement of the invention provides that a displacement pump, flow pump, or jet pump is used as the fluid pump. In principle, the fluid pump can be designed as desired, as long as by means of the pump, fluid can be withdrawn from the exhaust gas line into the bypass line and subsequently can be introduced from the bypass line into the exhaust gas line. If the displacement pump or the flow pump is used as a fluid pump, no further fluid pump is usually necessary. If, on the other hand, the fluid pump is in the form of the jet pump, a negative pressure source or positive pressure source is thus usually necessary to operate the jet pump. A displacement pump or a flow pump, for example, is again used as such a pressure source. If the jet pump is used, then the displacement pump or the flow pump is thus preferably provided in addition to it. The pump types mentioned enable particularly effective circulation of the fluid in the bypass line and the exhaust gas line.

Finally, within the scope of a further embodiment of the invention, it can be provided that a vehicle catalytic converter and/or a particle filter is used as the exhaust gas purification device. In principle, the vehicle catalytic converter can be designed as desired. For example, the vehicle catalytic converter is a three-way catalytic converter, an oxidation catalytic converter, a storage catalytic converter, in particular a $NO_x$ storage catalytic converter, or an SCR catalytic converter. Alternatively, the exhaust gas purification device is provided as a particle filter, preferably as a diesel particle filter or as a gasoline particle filter. The exhaust gas purification device can also be designed as a combination of vehicle catalytic converter and particle filter. In this case, the exhaust gas purification device is preferably a particle filter having a catalytic coating. The described design enables particularly effective purification of the exhaust gas of the drive unit.

The invention furthermore relates to a drive device, in particular for carrying out the method according to the embodiments in the scope of this description, wherein the drive device includes a drive unit and an exhaust gas purification device arranged in an exhaust gas line for purifying exhaust gas of the drive unit, wherein the exhaust gas purification device is heatable by means of an electrical heating assembly, which includes a heating element for heating a fluid and a bypass line, which branches off on one side of the exhaust gas device from the exhaust gas line and on the other side opens into it, and in which a fluid pump is arranged for conveying the fluid through the exhaust gas purification device. It is provided that the drive device is designed, in order to heat the exhaust gas purification device before the drive unit is started, to operate the fluid pump for fluid heated by means of the heating element to flow through the exhaust gas purification device against an exhaust gas flow direction through the exhaust gas line.

The advantages of such a procedure and such a design of the drive device have already been discussed. Both the drive device and the method for its operation can be refined according to the embodiments in the scope of this description, to which reference will therefore be made.

BRIEF DESCRIPTION OF THE FIGURES

In the following, the invention will be explained in greater detail with reference to the exemplary embodiments depicted in the drawings, without this restricting the invention. In the figures.

DETAILED DESCRIPTION

Figure 1:
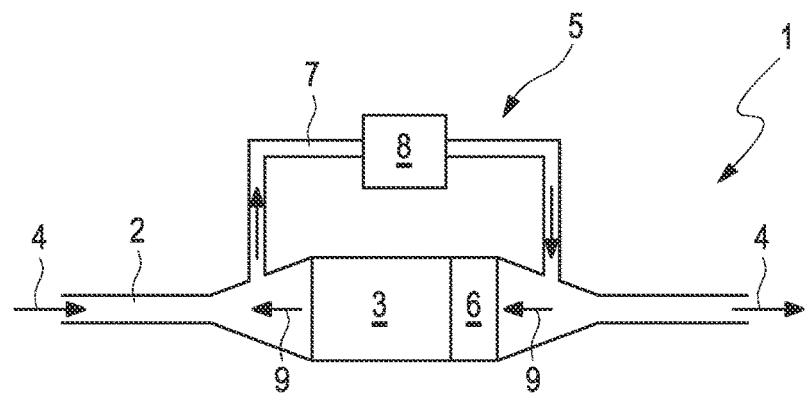
FIG. 1 shows a schematic illustration of a drive device in a first embodiment.

FIG. 1 shows a schematic illustration of a drive device 1, in particular for a motor vehicle, in a first embodiment. The drive device 1 has a drive unit (not shown here) and an exhaust gas line 2 in which an exhaust gas purification device 3 is arranged. During operation of the drive unit, which is provided in the form of an internal combustion engine, for example, exhaust gas of the drive unit flows through the exhaust gas line 2 and the exhaust gas purification device 3 in an exhaust gas flow direction indicated by arrows 4.

The drive device 1 also has an electrical heating assembly 5, which includes a heating element 6, a bypass line 7, and a fluid pump 8. The bypass line 7 opens into the exhaust gas line 2 on both sides of the exhaust gas purification device 3. In the exemplary embodiment shown here, the fluid pump 8 is arranged in the bypass line 7, whereas the heating element 6 is provided in the exhaust gas line 2, namely downstream of the exhaust gas purification device 3 with respect to the exhaust gas flow direction.

It is provided that to heat the exhaust gas purification device 3 before the drive unit is started, the fluid pump 8 is operated in such a way that fluid heated by means of the heating element 6 flows through the exhaust gas purification device 3 against the exhaust gas flow direction. For this purpose, fluid is withdrawn from the exhaust gas line 2 upstream of the exhaust gas purification device 3 with respect to the exhaust gas flow direction and fed back to it downstream of the exhaust gas purification device 3. This fluid now flows through the heating element 6 and is heated in the process. The fluid then flows through the exhaust gas purification device 3, namely according to the arrows 9, and thus heats it up. The fluid can then be withdrawn again from the exhaust gas line 2 into the bypass line 7, so that a circulation flow is present in the exhaust gas line 2 and the bypass line 7 via the exhaust gas purification device 3 and the heating element 6.

Figure 2:
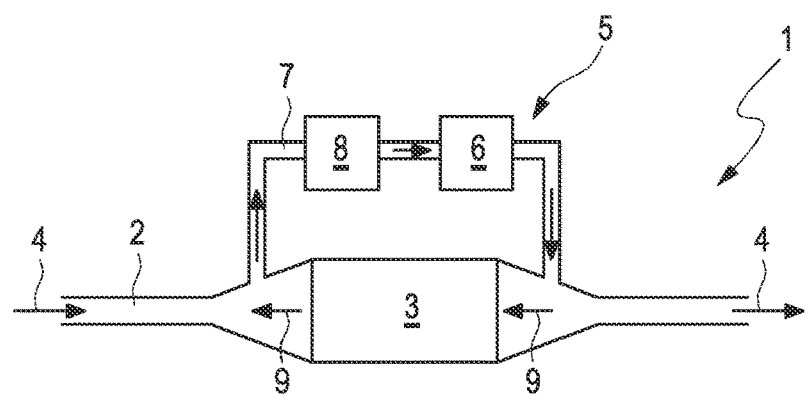
FIG. 2 shows a schematic illustration of a drive device in a second embodiment.

FIG. 2 shows a schematic illustration of the drive device 1 in a second embodiment. This is similar to the first embodiment, so that reference is made to the corresponding statements and only the differences are discussed below. These are due to the fact that the heating element 6 is now not present in the exhaust gas line 2, but rather in the bypass line 7. The exhaust gas withdrawn from the exhaust gas line 2 is accordingly guided in the bypass line 7 through the heating element 6 and heated in the process. The heated fluid is introduced into the exhaust gas line 2 downstream of the exhaust gas purification device 3 with respect to the exhaust gas flow direction, so that it can flow through the exhaust gas purification device 3, namely in the direction of the arrows 9.

Figure 3:
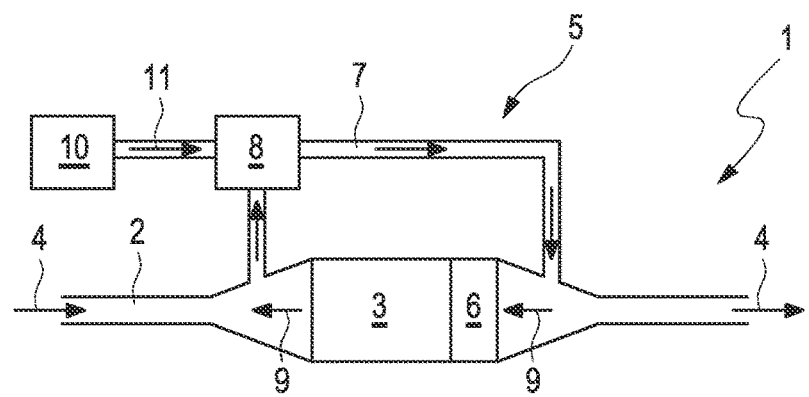
FIG. 3 shows a schematic illustration of a drive device in a third embodiment.

FIG. 3 shows a schematic illustration of the drive device in a third embodiment. Again, reference is made to the statements above relating to the first embodiment and only the differences are discussed. These can be seen in the fact that a jet pump, namely a suction jet pump, is used as the fluid pump 8 which is present in the bypass line 7. To supply the jet pump with a propellant medium, a further pump 10 is additionally provided, which supplies the propellant medium to the fluid pump 8 according to the arrow 11.

Figure 4:
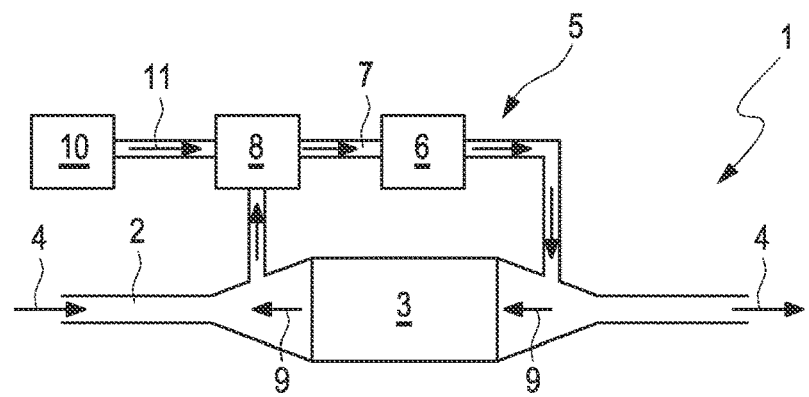
FIG. 4 shows a schematic illustration of a drive device in a fourth embodiment.

FIG. 4 shows the drive device 1 in a fourth embodiment, in a schematic illustration. The fourth embodiment represents a combination of the second embodiment and the third embodiment, so that reference is made to the above statements in their entirety. The differences from the first embodiment can be seen in the fact that the heating element 6 is present in the bypass line 7 according to the second embodiment, and that the fluid pump 8 is present as a jet pump according to the third embodiment. The further statements relating to the designs described above continue to apply unchanged.

Using the described design of the drive device 1, reliable, rapid, and above all even heating of the exhaust gas purification device 3 is achieved, namely by heated fluid flowing through the exhaust gas purification device 3 against the exhaust gas flow direction, as indicated by the arrows 9. The heating element 6 is an electrical heating element, and is thus heated using electrical current. This ensures that the exhaust gas purification device 3 is heated even before the drive unit is started.

LIST OF REFERENCE NUMERALS

1 drive device
2 exhaust gas line
3 exhaust gas purification device
4 arrows
5 heating assembly
6 heating element
7 bypass line
8 fluid pump
9 arrows
10 pump
11 arrow

The invention claimed is:

1. A method for operating a drive device which includes a drive unit and an exhaust gas purification device arranged in an exhaust gas line for purifying exhaust gas from the drive unit, wherein the exhaust gas purification device is heated at least temporarily by an electrical heating assembly, which includes a heating element for heating a fluid and a bypass line branching off the exhaust gas purification device from the exhaust gas line on the one hand and opening into it on the other hand, in which a fluid pump for conveying the fluid through the exhaust gas purification device is arranged, wherein to heat the exhaust gas purification device before the drive unit is started, the fluid pump is operated for fluid heated by the heating element to flow through the exhaust gas purification device against an exhaust gas flow direction through the exhaust gas line,
wherein a second pump is additionally provided to supply a predetermined medium to the fluid pump.

2. The method according to claim 1, wherein the heating element is arranged in the bypass line and, for heating the exhaust gas purification device, the fluid is withdrawn from the exhaust gas pipe upstream of the exhaust gas purification device with respect to the exhaust gas flow direction, heated by the heating element, and fed back to the exhaust gas line downstream of the exhaust gas purification device, so that fluid heated by the heating element flows through the exhaust gas purification device.

3. The method according to claim 1, wherein the heating element is arranged in the exhaust gas line downstream of the exhaust gas purification device with respect to the exhaust gas flow direction and, to heat the exhaust gas purification device, the fluid is withdrawn from the exhaust gas line upstream of the exhaust gas purification device with respect to the exhaust gas flow direction and fed back to the exhaust gas line to flow through the exhaust gas purification device downstream of the exhaust gas purification device, so that the fluid is heated by the heating element and subsequently flows through the exhaust gas purification device.

4. The method according to claim 1, wherein the heating element is arranged in the exhaust gas line downstream of the exhaust gas purification device with respect to the exhaust gas flow direction and, to heat the exhaust gas purification device, the fluid heated by the heating element is withdrawn from the exhaust gas line upstream of the exhaust gas purification device with respect to the exhaust gas flow direction and fed back to the exhaust gas line to flow through the exhaust gas purification device downstream of the exhaust gas purification device, so that the fluid heated by the heating element flows through the exhaust gas purification device.

5. The method according to claim 1, wherein at least one further exhaust gas purification device is arranged in the exhaust gas line downstream of the exhaust gas purification device and the fluid for heating the exhaust gas purification device is introduced into the exhaust gas line downstream of the further exhaust gas purification device.

6. The method according to claim 1, wherein for further heating of the exhaust gas purification device after starting the drive unit, the fluid pump is operated for fluid heated by the heating element to flow through the exhaust gas purification device in the exhaust gas flow direction through the exhaust gas line.

7. The method according to claim 1, wherein a heating disk directly adjoining the exhaust gas purification device fluidically is used as the heating element.

8. The method according to claim 1, wherein a displacement pump, flow pump, or jet pump is used as the fluid pump.

9. The method according to claim 1, wherein a vehicle catalytic converter and/or a particle filter is used as the exhaust gas purification device.

10. The method according to claim 2, wherein the heating element is arranged in the exhaust gas line downstream of the exhaust gas purification device with respect to the exhaust gas flow direction and, to heat the exhaust gas purification device, the fluid is withdrawn from the exhaust gas line upstream of the exhaust gas purification device with respect to the exhaust gas flow direction and fed back to the exhaust gas line to flow through the exhaust gas purification device downstream of the exhaust gas purification device, so that the fluid is heated by the heating element and subsequently flows through the exhaust gas purification device.

11. The method according to claim 2, wherein the heating element is arranged in the exhaust gas line downstream of the exhaust gas purification device with respect to the exhaust gas flow direction and, to heat the exhaust gas purification device, the fluid heated by the heating element is withdrawn from the exhaust gas line upstream of the exhaust gas purification device with respect to the exhaust gas flow direction and fed back to the exhaust gas line to flow through the exhaust gas purification device downstream of the exhaust gas purification device, so that the fluid heated by the heating element flows through the exhaust gas purification device.

12. The method according to claim 3, wherein the heating element is arranged in the exhaust gas line downstream of the exhaust gas purification device with respect to the exhaust gas flow direction and, to heat the exhaust gas purification device, the fluid heated by the heating element is withdrawn from the exhaust gas line upstream of the exhaust gas purification device with respect to the exhaust gas flow direction and fed back to the exhaust gas line to flow through the exhaust gas purification device downstream of the exhaust gas purification device, so that the fluid heated by the heating element flows through the exhaust gas purification device.

13. The method according to claim 2, wherein at least one further exhaust gas purification device is arranged in the exhaust gas line downstream of the exhaust gas purification device and the fluid for heating the exhaust gas purification device is introduced into the exhaust gas line downstream of the further exhaust gas purification device.

14. The method according to claim 3, wherein at least one further exhaust gas purification device is arranged in the exhaust gas line downstream of the exhaust gas purification device and the fluid for heating the exhaust gas purification device is introduced into the exhaust gas line downstream of the further exhaust gas purification device.

15. The method according to claim 4, wherein at least one further exhaust gas purification device is arranged in the exhaust gas line downstream of the exhaust gas purification device and the fluid for heating the exhaust gas purification device is introduced into the exhaust gas line downstream of the further exhaust gas purification device.

16. The method according to claim 2, wherein for further heating of the exhaust gas purification device after starting the drive unit, the fluid pump is operated for fluid heated by the heating element to flow through the exhaust gas purification device in the exhaust gas flow direction through the exhaust gas line.

17. The method according to claim 3, wherein for further heating of the exhaust gas purification device after starting the drive unit, the fluid pump is operated for fluid heated by the heating element to flow through the exhaust gas purification device in the exhaust gas flow direction through the exhaust gas line.

18. The method according to claim 4, wherein for further heating of the exhaust gas purification device after starting the drive unit, the fluid pump is operated for fluid heated by the heating element to flow through the exhaust gas purification device in the exhaust gas flow direction through the exhaust gas line.

19. The method according to claim 5, wherein for further heating of the exhaust gas purification device after starting the drive unit, the fluid pump is operated for fluid heated by the heating element to flow through the exhaust gas purification device in the exhaust gas flow direction through the exhaust gas line.

20. A drive device comprising: a drive unit and an exhaust gas purification device arranged in an exhaust gas line for purifying exhaust gas from the drive unit, wherein the exhaust gas purification device is heatable by an electrical heating assembly, which includes a heating element for heating a fluid and a bypass line branching off the exhaust gas purification device from the exhaust gas line on the one hand and opening into it on the other hand, in which a fluid pump for conveying the fluid through the exhaust gas purification device is arranged, wherein the drive device is designed, in order to heat the exhaust gas purification device before the drive unit is started, to operate the fluid pump for fluid heated by the heating element to flow through the exhaust gas purification device against an exhaust gas flow direction through the exhaust gas line, wherein a second pump is additionally provided to supply a predetermined medium to the fluid pump.

* * * * *